(12) United States Patent
Giannakakos et al.

(10) Patent No.: US 6,561,913 B2
(45) Date of Patent: May 13, 2003

(54) COLD HEAD STAMPED FASTENER INSERTS INCLUDING SELECTIVELY REMOVABLE TANGS

(75) Inventors: William Giannakakos, Danbury, CT (US); John F. Carvalho, Danbury, CT (US); Roger Zitnay, Easton, CT (US); J. Peter Ferreira, Danbury, CT (US)

(73) Assignee: Newfrey LLC, Newark, DE (US)

( * ) Notice: Subject to any disclaimer, the term of this patent is extended or adjusted under 35 U.S.C. 154(b) by 106 days.

(21) Appl. No.: 09/815,799

(22) Filed: Mar. 23, 2001

(65) Prior Publication Data

US 2002/0136615 A1 Sep. 26, 2002

(51) Int. Cl.[7] .............................. B21D 53/24; B21K 1/64
(52) U.S. Cl. .............................. 470/87; 470/20; 470/21; 470/25; 470/905
(58) Field of Search .................................. 470/8, 18, 19, 470/20, 21, 25, 87, 88, 905; 411/178

(56) References Cited

U.S. PATENT DOCUMENTS

| 2,371,674 | A | * | 3/1945 | Caminez |
| 3,934,293 | A | * | 1/1976 | Ho Lee |
| 3,945,070 | A | * | 3/1976 | Hauser ........................ 470/20 |
| 4,058,865 | A | * | 11/1977 | Lee |
| 4,563,119 | A | * | 1/1986 | Cosenza ...................... 411/438 |
| 4,645,398 | A | * | 2/1987 | Cosenza et al. ............. 411/438 |
| 6,146,073 | A | * | 11/2000 | Kobusch ...................... 411/178 |

FOREIGN PATENT DOCUMENTS

EP               1060812 A2 * 10/2000

* cited by examiner

*Primary Examiner*—Ed Tolan
(74) *Attorney, Agent, or Firm*—Harness, Dickey & Pierce, P.L.C.

(57) ABSTRACT

The present invention provides for fastener inserts and methods of manufacturing the same. The fastener inserts include selectively removable tangs which can be broken away more cleanly than with other commercially available fastener inserts. Further, the methods of manufacture offer a significant improvement in the production process.

17 Claims, 5 Drawing Sheets

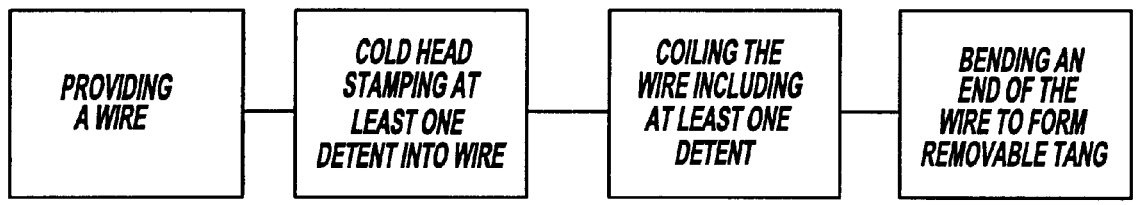
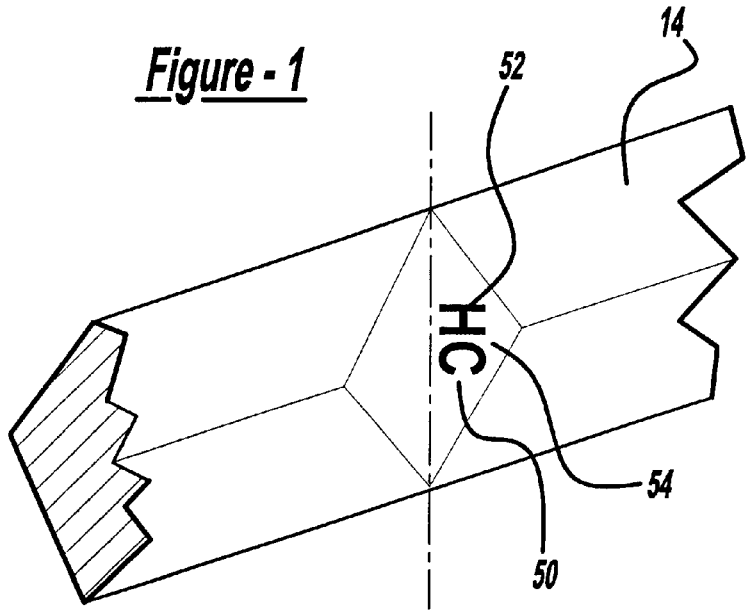
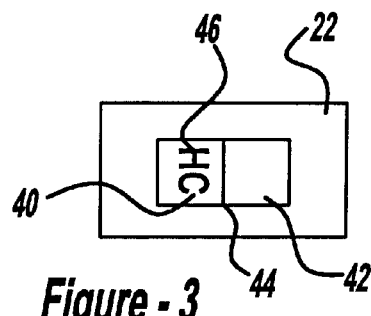
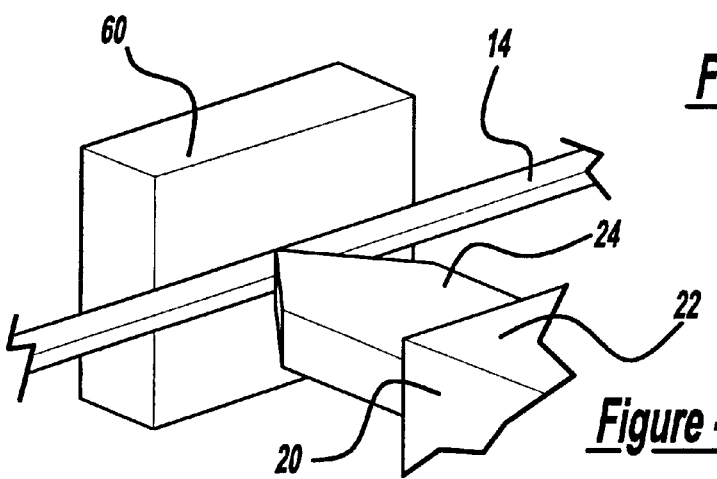

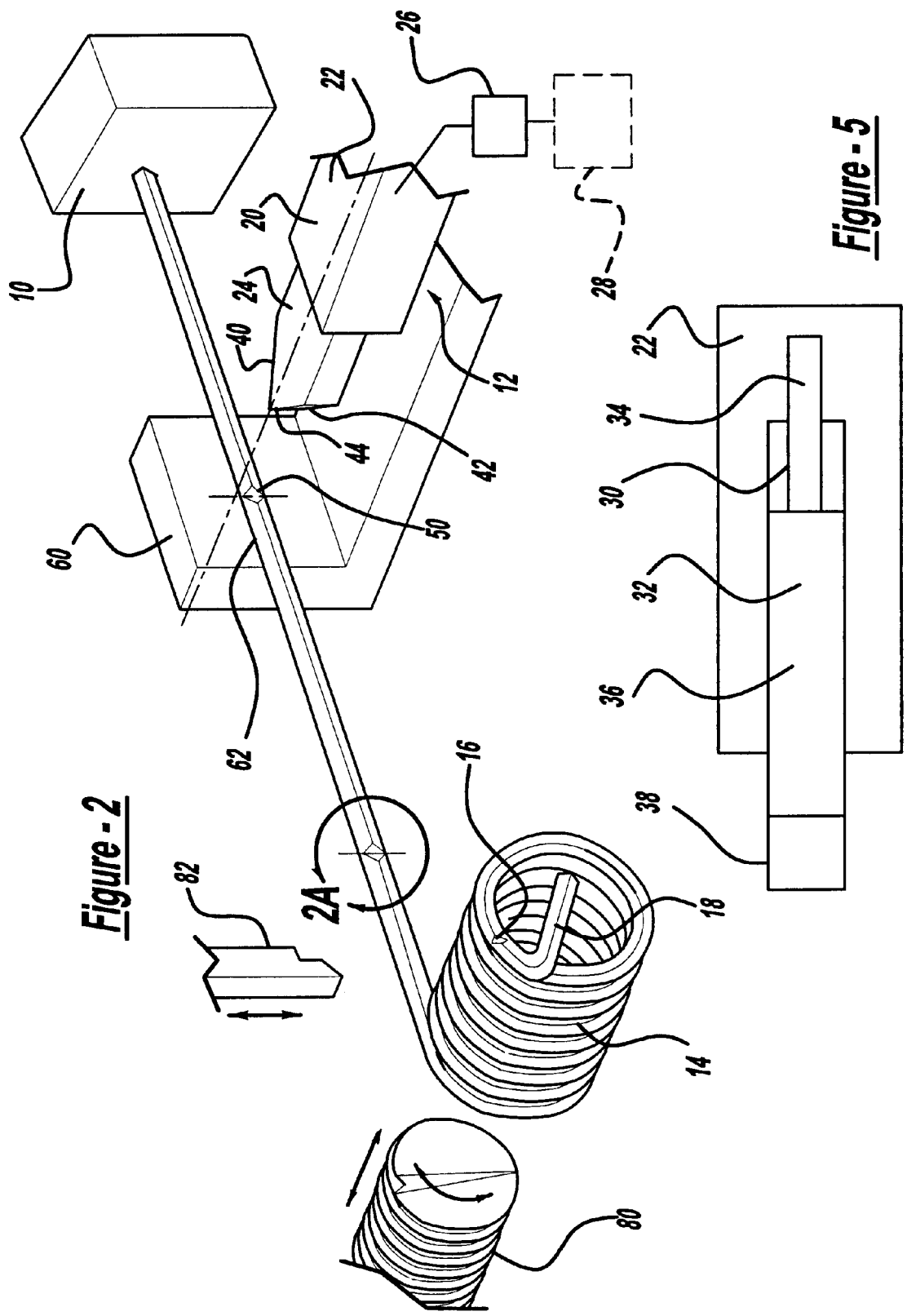

COLD HEAD STAMPED FASTENER INSERTS INCLUDING SELECTIVELY REMOVABLE TANGS

FIELD OF THE INVENTION

The present invention relates to fastener inserts and, more particularly, to fastener inserts including a cold head stamped detent to form selectively removable tangs, an apparatus for cold head stamping fastener inserts and methods of manufacturing cold head stamped fastener inserts.

BACKGROUND OF THE INVENTION

Fastener inserts of varying design for maintaining a fastener within a tapped hole or nut assembly are commonly employed. The use of such fastener inserts offer many advantages including, by way of non-limiting example, providing a more balanced distribution of dynamic and static loads throughout the length of engagement between fasteners and the substrate.

To facilitate the disposition of the fastener insert within a tapped hole or nut, often such inserts are provided with a selectively removable tang. The tang typically includes a notch which is milled, sheared, cut or ground into the insert which allows the tang to be broken off. Once the fastener insert is properly positioned within the tapped hole or nut, pressure is exerted on the tang which causes the tang to break away from the fastener insert body and provide an unencumbered passageway for the insertion of a fastener.

The notch on the removable tang has heretofore been formed via milling, shearing, cutting or grinding using a notch cutter or similar tool prior to coiling the wire. In order to carry out the notching step, the wire must be stopped in the middle of the cycle and prior to the coiling step which adds to the time and expense of manufacturing. While the invention of EP 1060812 A2 attempts to address certain problems associated with stopping or significantly slowing down the production process, this document appears to relate to fastener inserts formed from pre-spooled or pre-rolled wires including milled or sheared notches. As a result of notching and rolling the wire and subsequently coiling the wire, a variation on the insert outside diameter and length can result when utilizing different lots or reels of stainless steel wire. Thus, pre-forming the notch on a whole reel of the material could result in processing problems during the coiling operation. This is based on the fact that if the insert diameter or insert length changes due to variation in the wire spring back, the pre-determined location of the notch will not meet location requirements for proper tang break-off after installation. The helically coiled insert will not be dimensioned correctly. The whole reel of pre-notched wire will have to be scrapped.

Another critical element that can result in material damage or losses is based on the fact that the majority of the wire utilized to manufacture the helically coiled inserts are of small diameter in the areas of 0.010" to 0.050". Based on this fact, a pre-notched reel of wire contains thousand and thousands of strands and tens of thousands of notches. It would be very easy for this wire to be tangled, nicked or to break at any of the pre-notched locations if not handled with extreme caution and care. This can further result in additional material losses or operating and set up problems during the coiling operation.

Further, there are certain safety issues introduced into the manufacturing process as a result of milling, such as metal chip formation. Sharpening of the milling apparatus also may pose certain risks.

Yet another problem with heretofore known fastener inserts is the inability to identify similarly shaped inserts from one manufacturer to the next. This is especially problematic where fastener insert quality varies among manufacturers.

In view of the foregoing, a notched fastener insert which solves one or more of the enumerated problems is desirable.

SUMMARY OF THE INVENTION

The present invention therefore relates to a method of manufacturing an insert comprising the steps of:
  a) providing a wire;
  b) cold head stamping the wire to form a detent in said wire;
  c) coiling the wire to form a helically coiled body; and
  d) bending an end of said wire in proximity to said detent to provide a selectively removable tang.

The present invention further relates to a fastener insert comprising:
  a wire body having a plurality of convolutions;
  at least one detent cold formed into said wire body; and
  a selectively removable tang extending from said body in proximity to said at least one detent.

Still another aspect of the present invention is a method of marking fastener inserts, wherein the method generally comprises the steps of:
  a) providing a wire;
  b) cold head stamping marking on said wire; and
  c) coiling the wire to form a helically coiled body.

The present invention further relates to a fastener insert comprising:
  a wire body having a plurality of convolutions; and
  a marking stamped into said wire body to provide an identifier on said insert.

An apparatus for cold head stamping wire to be formed into fastener inserts is also provided in accordance with the teachings of the present invention. The cold head stamping apparatus for use in association with wire comprises:
  a fixture;
  a selectively extendable and retractable stamping die supported by said fixture for stamping a detent into said wire; and
  an actuator for intermittently extending and retracting said stamping die.

In contrast to milling, the cold head stamping of a detent in accordance with the teachings of the present invention, eliminate the issues of metal chip formation and ejection and repeated tool sharpening. Further, the cold head stamping process can be carried out before or during the coiling step which is preferred and gives rise to shorter production cycle times. Additionally, as a result of the cold head stamping, the notch itself is improved to give a cleaner, e.g. burr free, more efficient break point between the tang and the body of the fastener insert.

The ability to mark the fastener inserts with an identifier designating the manufacturer, material or other pertinent information can have a significant impact on quality control considerations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic view demonstrating the steps of manufacturing a cold head stamped fastener insert;

FIG. 2 is a perspective view of a first cold head stamping apparatus useful in forming cold head stamped fastener inserts;

FIG. 2A is a perspective view of the detent formed via the apparatus of FIG. 2;

FIG. 3 is a front view of the extendable and retractable stamping die of the cold head stamping apparatus of FIGS. 1 and 4;

FIG. 4 is a magnified perspective view showing the retractable punch of a cold head notching apparatus engaging the wire of the fastener insert;

FIG. 5 is a cross-sectional view of the cold head stamping fixture and stamping head;

DETAILED DESCRIPTION OF THE PREFERRED EMBODIMENTS

Figure 6:
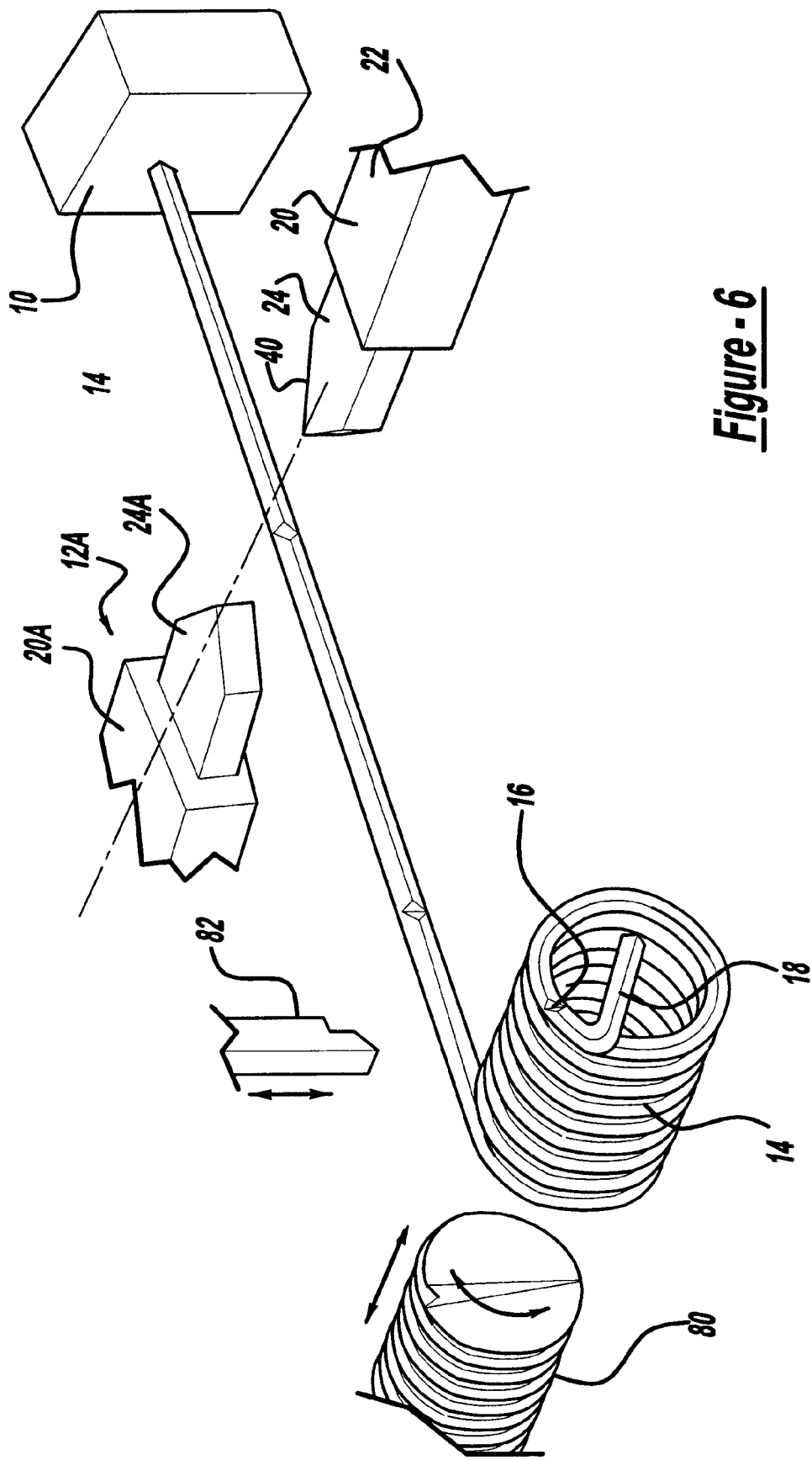
FIG. 6 is a perspective view of a second cold head stamping apparatus useful in forming cold head stamped fastener inserts.

The following description of the preferred embodiment(s) is merely exemplary in nature and is in no way intended to limit the invention, its application, or uses.

Referring to FIGS. 1 and 2, the process of cold head notching a fastener insert to provide a readily removable tang is demonstrated. A wire formed from a desired alloy such as stainless steel, by way of non-limiting example, is provided. The wire, which is generally preformed to the desired circumferential geometry, is advanced through a wire guide 10 using a known automated feeding apparatus (not shown).

The wire is further advanced to a cold head stamping station 12 wherein at least one detent of predetermined shape and depth is provided in the wire. Under a preferred embodiment, as will be described in greater detail below, the wire is optionally provided with a marking at the cold head stamping station or at a separate cold head stamping station which can serve as a product and/or source identifier for the resulting fastener insert.

The detent can have a variety of shapes conducive to the removal of the resulting tang, but it is preferred that the detent have a substantial V-shape when viewed from the side with converging angled faces of between about 60° and 120°. In general, in order to obtain an effective cold head stamped detent for purposes of generating a selectively removable tang, the detent should have a minimum depth of about 30% of the wire thickness or width (single sided).

After stamping the wire 14 to provide at least one detent and optionally marking the wire, the wire is advanced and coiled to form the fastener insert body.

Thereafter, the leading end 16 of the coiled fastener insert body is bent in relative proximity to and before the detent to provide a selectively removable tang 18.

Referring to FIG. 2, there is shown a cold head stamping station 12 including a first cold head wire stamping apparatus 20 used to carry out the detent formation step discussed above. The apparatus 20 generally includes a fixture 22, a selectively extendable and retractable stamping die 24, and an actuator 26. The actuator 26 may be mechanically or pneumatically operated or may be computer linked to the PLC controller 28. The fixture 22 as shown in FIG. 5 includes an enclave 30 which houses the trailing end 32 of the stamping die. The fixture also includes a plunger 34 for activating the extension and retraction of the stamping die 24 upon receiving a signal by the activator.

The stamping die 24 includes a body 36, the trailing end of which is housed within the fixture 22. The stamping die also includes a head 38 for forming a detent into the wire 14. The head 38 generally includes first and second angularly advancing walls 40 and 42 as best shown in FIG. 3 which converge at a point 44 which is sufficiently sharp to penetrate and displace enough of the wire to form a detent 50.

As shown most clearly with reference to FIG. 3, angular wall 40 of the stamping die 24 generally includes a projection or recess 46 which is shaped such as to leave a marking along a surface of the detent as illustrated in FIG. 2A. As noted above, the marking can be useful as a source or product specification identifier. This marking 52 should generally occur along surface 54 of the detent as this portion remains a part of the fastener insert after the selectively removable tang 18 is broken away.

It is preferred that the cold head stamping apparatus 20 of FIG. 2 include a grooved backing plate 60. The backing plate 60 should have a sufficient strength to appropriately support the wire 14 as it is being stamped. The groove 62 is shaped such as to mate with the geometry of the wire to prevent undesired displacement of the wire during the stamping operation.

Referring to FIG. 6, a second cold head stamping station 12A including mutually opposing cold head stamping apparatuses 20 and 20A are provided. The stamping apparatuses 20 and 20A, generally include all of the same components as the stamping apparatus depicted in FIG. 2.

Figure 6A:
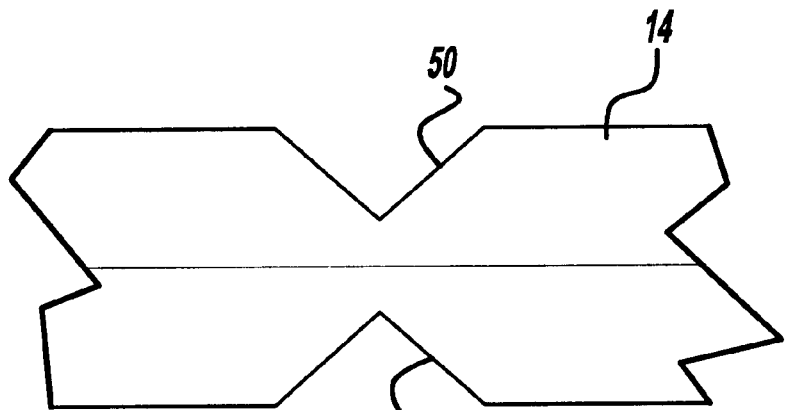
FIG. 6A is a perspective view of the detent formed via the apparatus of FIG. 6.
Figure 7A:
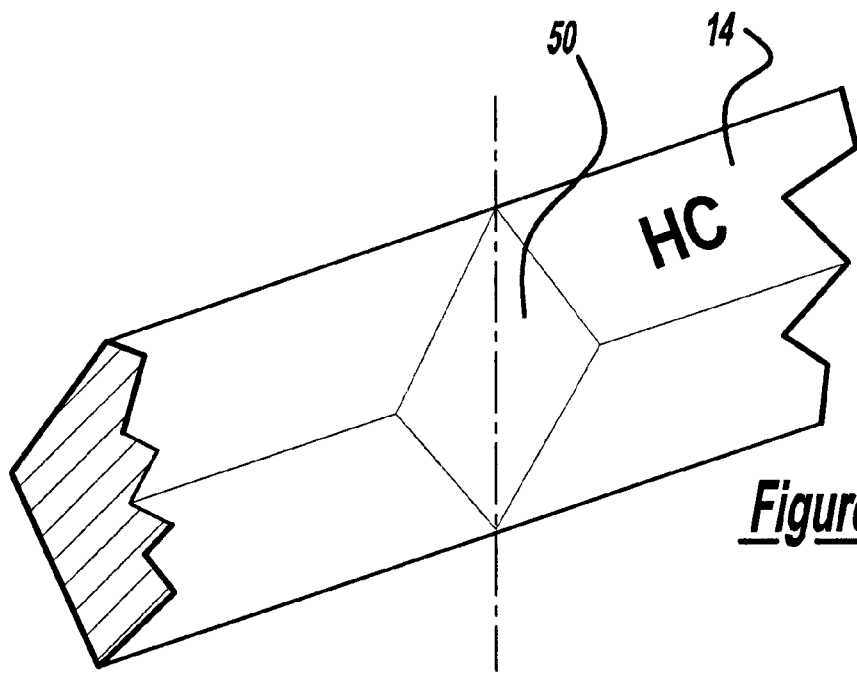
FIG. 7A is a perspective view of the detent and marking formed via the apparatuses of FIG. 7.

Preferably, the apparatuses 20 and 20A and, more particularly, the selectively extendable and retractable stamping dies 24 and 24A are cycled to simultaneously contact the wire from opposing directions so as to not displace the wire during the detent forming operation. As a result, a pair of mutually opposing detents 50 and 50A are provided along opposite sides of the wire as shown in FIG. 6A. According to this embodiment, the depth of each of the detents 50 and 50A should be on the order of at least about 15% of the wire thickness or width (dual sided). Again, one or both of the stamping dies can be provided with projections or recesses to mark the wire along at least one of the resulting detents.

Figure 7:
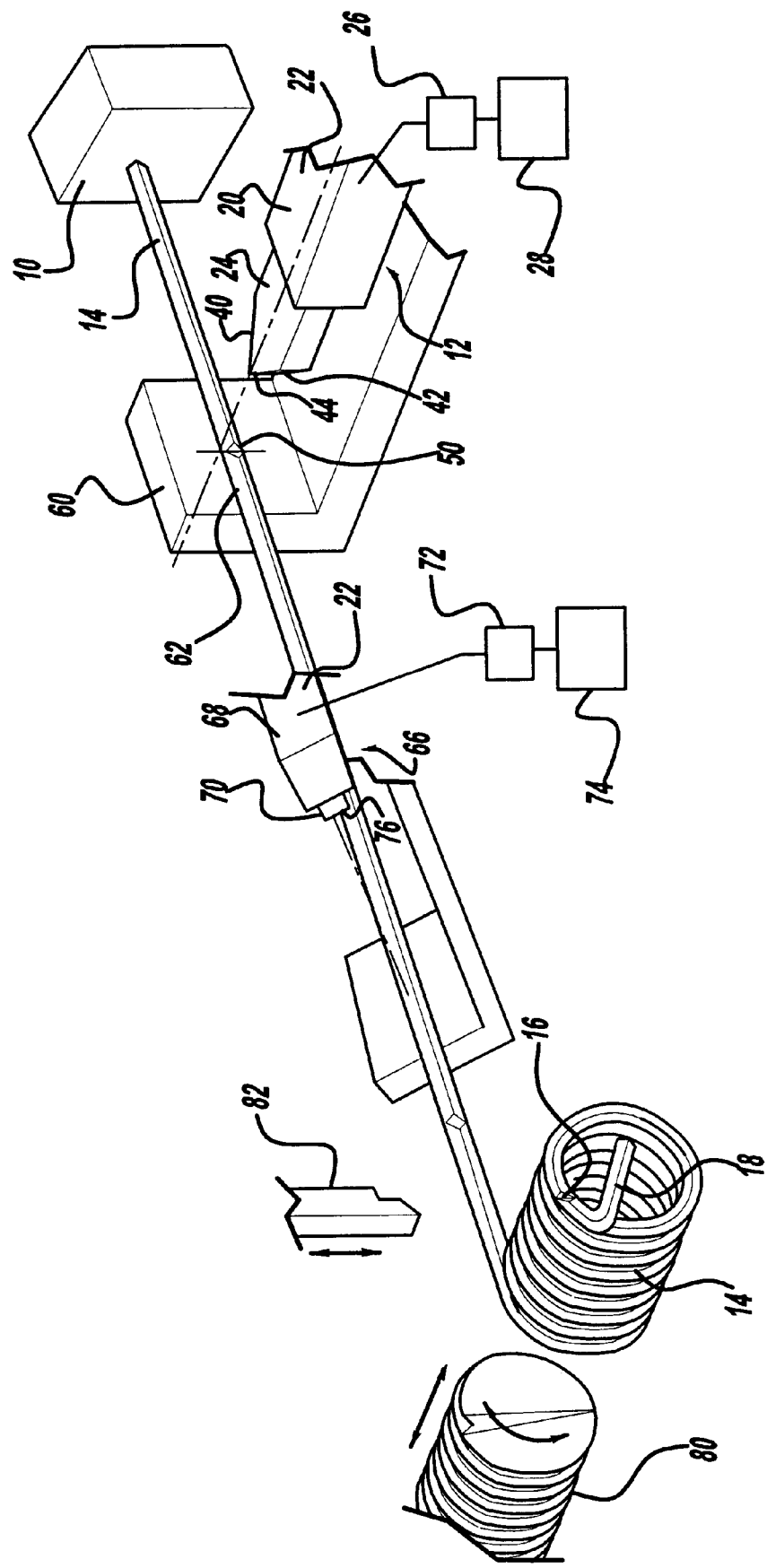
FIG. 7 is a perspective view of a fastener insert manufacturing process wherein the cold head detent and cold head marking functions are performed at separate stations along the process.

Referring to FIG. 7, a perspective view demonstrating an alternative process is shown. According to this process, the wire 14 is marked along a length of the wire other than the detent 50. Thus, a first cold head stamping station 12 is provided for purposes of forming the detent 50 and a second cold head stamping station 66 is provided for purposes of generating a marking on the wire. The cold head stamping station 12, while shown as the single detent forming variety as illustrated in FIGS. 2 and 2A, could also be in the form of a dual detent forming station as shown in FIGS. 6 and 6A.

Figure 8:
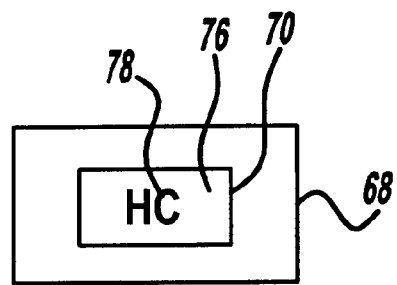
FIG. 8 is a front view of the extendable and retractable stamping die of the cold head marking apparatus.

The cold head marking apparatus 66 also generally includes a fixture 68, a selectively extendable and retractable stamping die 70, an actuator 72 and a computer 74. The stamping die 70 includes a wall 76 having a projection or recess 78 for leaving a marking along the wire as shown in FIG. 8.

In view of the above-described apparatuses, the production of a helically coiled fastener insert will now be described in greater detail. Once the cold heading fixture has been set up and positioned, wire is fed through the wire guide 10, cold head fixture 22 and then onto the selectively retractable mandrel 80. The wire is advanced and the wire is wound over the mandrel 80 which is rotated in a first direction. When the wire is advanced to the point that the coil is formed to the desired length, the mandrel 80 direction in reversed and the mandrel is generally retracted. At the end of the reverse cycle, the completed insert is cut off from the rest of the wire by cutter 82. It is at this point, while the cutting operation is occurring and the wire is momentarily stopped, that the stamping operation to form one or more detents, and preferably one or more markings occur. Preferably, the cold heading stamping and marking takes place about one to three wire insert lengths away from the part that is being coiled. While the distance can be shorter or greater, depending on insert size and length, this distance allows for calibration of the equipment without requiring a total shut down.

Cold heading the insert detent in this fashion internally to the coiling process is preferred over other suggested methods where the notch is formed in separate and distinct operations either before or after the coiling process. This process offers many distinct advantages over other processes. It provides flexibility to perform setup adjustments and make numerous corrections to the various insert features such as insert length adjustment, tang length and insert outer diameter adjustments, by way of non-limiting example, without affecting the required location of the detent on the insert.

Not only do the above described apparatuses speed up the production process by eliminating the need to stop the advancement of the wire while forming the detent, but the detent forming step itself is much faster than with cutting, milling or shearing. Additionally, the resulting fastener inserts tend to be improved. For example, it has been determined that the portion of the wire along and below the detent has an increased hardness of approximately twenty percent, e.g., a stainless steel wire having a hardness of between about 29 RC to 30 RC exhibits a hardness of at least about 36 RC along and below the detent. This increased hardness along and below the detent makes the material more brittle and forms a stress point which in turn allows the selectively removable tang to be broken off cleaner and with less force as compared to other known fastener inserts.

In order to demonstrate one or more of the advantages described herein, helically coiled fastener inserts having cold head stamped detents were manufactured from stainless steel wire, such that the detents had a depth of forty percent of material depth. The inserts were then mounted onto a fixture and linear pressure was applied to the removable tang in order to break off the tang. It was observed that approximately 38–40 ft. lbs. of force was required to break off the tangs cleanly from the rest of the insert.

Helically coiled fastener inserts formed from the same stainless steel wire, were notched using conventional milling techniques. The notch on these inserts were also developed to a depth of forty percent of the material depth. These inserts were also mounted to the same fixture and were processed through the same tests. After reaching readings of 40–45 ft. lbs., the tangs of the inserts would not break off. Once more force was applied, the result was to cause the insert to pull out of the holding fixture without breaking off the tang. The depth of the notch had to be increased to 50% of the material depth before the tangs broke off at the 40 ft. lbs. level.

Thus, not only does the present invention offer significant reduction in production times necessary to manufacture an insert, but also gives rise to an improved fastener insert.

The description of the invention is merely exemplary in nature and, thus, variations that do not depart from the gist of the invention are intended to be within the scope of the invention. Such variations are not to be regarded as a departure from the spirit and scope of the invention. For example, the detent or detents can be found in the face of the wire (width) as illustrated or it can be formed tangent to the height of the wire.

What is claimed is:

1. An improved fastener insert production method comprising the steps of:
   a) providing a wire;
   b) cold head stamping the wire to form a first detent in said wire;
   c) coiling the wire to form a helically coiled body;
   d) bending an end of said wire in proximity to said detent to provide a selectively removable tang; and
   e) cold head stamping the wire to form a second detent in said wire after the step of coiling the wire to form a helically coiled body.

2. The method of claim 1 wherein said at least one detent has a V-shape.

3. The method of claim 2 wherein said first detent has a minimum depth of about 30%.

4. The method of claim 1 wherein said first detent is a pair of mutually opposing detents occurring along opposite sides of said wire.

5. The method of claim 4 wherein said pair of mutually opposing detents has a minimum depth of about 15%.

6. The method of claim 1 wherein said wire has an increased hardness along said first detent.

7. The method of claim 1 further comprising a marking step wherein said wire is marked by cold head stamping.

8. The method of claim 7 wherein said marking step is carried out simultaneously with the first detent forming step.

9. The method of claim 8 wherein marking occurs along said first detent.

10. The method of claim 1 further comprising severing the helically coiled body from the wire.

11. The method of claim 1 further comprising severing the helically coiled body while the step of forming a second detent is occurring.

12. The method of claim 2 further comprising severing the helically coiled body while the step of forming the second detent is occurring.

13. A method of marking fastener inserts comprises the steps of:
   a) providing a wire;
   b) cold head stamping the wire to form a first detent and a first marking on said wire;
   c) coiling the wire to form a helically coiled body; and
   d) cold head stamping the wire after the step of coiling the wire to form a helically coiled body to form a second marking and a second detent.

14. The method of claim 13, wherein said first detent includes said first marking.

15. The method of claim 14, wherein said cold head stamping simultaneously forms the first detent in said wire and forms the first marking within said first detent.

16. The method of claim 13 further comprising severing the helically coiled body from the wire.

17. An apparatus for cold head stamping wire to be formed into fastener inserts comprising:
- a fixture;
- a selectively extendable and retractable stamping die supported by said fixture for stamping a detent into said wire;
- an actuator for intermittently extending and retracting said stamping die;
- a mandrel configured to form the wire into a helical body; and
- a cutting apparatus configured to cut the wire after said helical body is formed, wherein said selectively extendable and retractable stamping die is configured to stamp a detent in the wire after the helical body is formed.

* * * * *